United States Patent [19]

Bardwell

[11] Patent Number: 4,647,760

[45] Date of Patent: Mar. 3, 1987

[54] PATTERN TRACER WITH ELECTRONIC KERF, CALIBRATION AND LINE WIDTH COMPENSATION

[75] Inventor: Francis G. Bardwell, Elmhurst, Ill.

[73] Assignee: Stewart-Warner Corporation, Chicago, Ill.

[21] Appl. No.: 538,494

[22] Filed: Oct. 3, 1983

[51] Int. Cl.⁴ .................... G05B 1/00; G05B 19/33
[52] U.S. Cl. ................................ 250/202; 318/577
[58] Field of Search ................. 318/577; 250/202

[56] References Cited

U.S. PATENT DOCUMENTS

| Re. 30,938 | 5/1982 | Kallen | 318/577 |
| 3,920,316 | 11/1975 | Daguillon | 250/202 |
| 4,160,199 | 7/1979 | Bardwell | 250/202 |
| 4,396,832 | 8/1983 | Henderson | 318/577 |
| 4,453,084 | 6/1984 | Brouwer | 318/577 |
| 4,578,574 | 3/1986 | Grant et al. | 250/202 |

Primary Examiner—David C. Nelms
Assistant Examiner—Michael Messinger
Attorney, Agent, or Firm—A. G. Douvas

[57] ABSTRACT

A pattern tracer with circuitry for electronically adjusting the lateral offset of the tracing element for kerf compensation, that produces a control signal based on a temporal relationship between a reference signal and a pattern detection signal associated with a preselected kerf compensation. The pattern is traced with the selected lateral offset in accordance with a control signal. The control signal is developed in response to both a line width compensation signal and a kerf compensation signal. A photometric detector is calibrated by electronically adding a compensation angle to a pattern detection angle to compensate for any physical misalignment of the detector.

10 Claims, 5 Drawing Figures

PATTERN TRACER WITH ELECTRONIC KERF, CALIBRATION AND LINE WIDTH COMPENSATION

BACKGROUND OF THE INVENTION

This invention relates to pattern tracers and, more particularly, to pattern tracers having kerf compensation features.

Pattern tracers of the type which photometrically detect and follow a pattern are well known. Examples of such tracers are shown in U.S. Pat. No. 4,160,199 of Bardwell; U.S. Pat. No. 4,128,297 of Bourne and U.S. Pat. No. 3,704,373 of Bardwell et al.

As discussed in these patents, the movement of a tracing element which follows the pattern is used to control the movement of a cutting tool along the surface of a work piece from which the pattern is being cut. If the pattern represents the precise dimensions of the piece to be cut, then compensation must be provided for kerf which is the width of the cut formed by the particular tool being employed.

There are two types of kerf: positive and negative. In those instances in which a hole is being cut from a work piece, the tracing element must follow the pattern laterally offset inwardly from the pattern at a distance equal to half the kerf. Compensation for such kerf is referred to as inner, or positive, kerf compensation. When a product is being cut from the interior of a work piece, then the tracing element must follow the pattern laterally offset outwardly from the pattern. Compensation for such kerf is referred to as outer, or negative, kerf compensation.

The magnitude of kerf is different for different tools and the sense of the kerf, either positive or negative, is different for different patterns. Accordingly, the kerf compensation must be adjustable with respect to both sense and magnitude.

Many known kerf adjustment techniques undesirably require mechanical adjustments which are awkward to use, subject to mechanical wear and unduly complicated. For instance, in Bardwell et al. U.S. Pat. No. 3,704,373, a pattern photodetector, a lens and other related elements are manually moved by means of a kerf adjustment knob. A mechanical adjustment technique is also apparently used in the system shown in Bourne U.S. Pat. No. 4,128,297.

Another undesirable feature of many known pattern tracers is the necessity of very precise alignment of the photo sensors used to detect the pattern. For instance, in a system using a circular array of sensors and a fixed coordinate system, a reference sensor must be in precise alignment with one of axis of the coordinate system. If not, all the angles detected by the photo detector will differ from the true pattern angles by an amount equal to the degree of misalignment and an associated erroneous offset will result in the tracing. Unfortunately, such mounting misalignment inherently occurs. In known pattern tracers, such misalignment is solved by re-mounting the sensors until they are in as close of an alignment as can be achieved.

Accurate cutting of the work piece under control of a pattern tracer also requires the pattern tracer to compensate for the thickness of the pattern line. In some instances it is desired to follow the center of the line, but in other instances, it is desired to trace alongside an inner or outer edge of a line. A line width compensation circuit for performing this function is shown in Bardwell U.S. Pat. No. 4,160,199. However, this circuit is limited to only a line width compensation function, and kerf compensation adjustment is provided by mechanical means.

SUMMARY OF THE INVENTION

The principal object of the present invention is to provide a pattern tracer in which adjustment for kerf compensation is performed electronically instead of mechanically.

Preferably, this objective is achieved by means for producing a control signal for the pattern tracer which is defined by the temporal relationship between a periodic timing reference signal and a pattern detection signal and means for selectively altering said relationship to one associated with a predetermined kerf. In a preferred embodiment, a counter is set to a preselected count associated with a given kerf. This causes a reference signal generated by the counter to occur either sooner or later than it would otherwise occur during periodic scanning cycles.

Another objective is the provision of a pattern tracer in which misalignments of the photometric sensors of the pattern detector are compensated for electronically. In a preferred embodiment, the tracer movement is controlled in accordance with a control signal which is altered to achieve the desired misalignment compensation. A compensation angle representative of the degree of misalignment is electronically added to or subtracted from a detected pattern angle to produce the control signal.

A further object is to provide a pattern tracer with both line width and kerf compensation circuits having common elements shared by both. Preferably, means responsive to both a photometric pattern detecting means, on the one hand, and line width and kerf compensation signals, on the other hand, establish a control signal for tracing the pattern with the desired degree of line width and kerf compensation. Optionally, misalignment compensation is also achieved through selected alteration of this same control signal.

BRIEF DESCRIPTION OF THE DRAWINGS

The foregoing objects and means for achieving them will be described in detail and further objects, features and advantages will be made apparent from the following detailed description of the preferred embodiment which is given with reference to the several figures of the drawing, in which.

DETAILED DESCRIPTION

Figure 1:
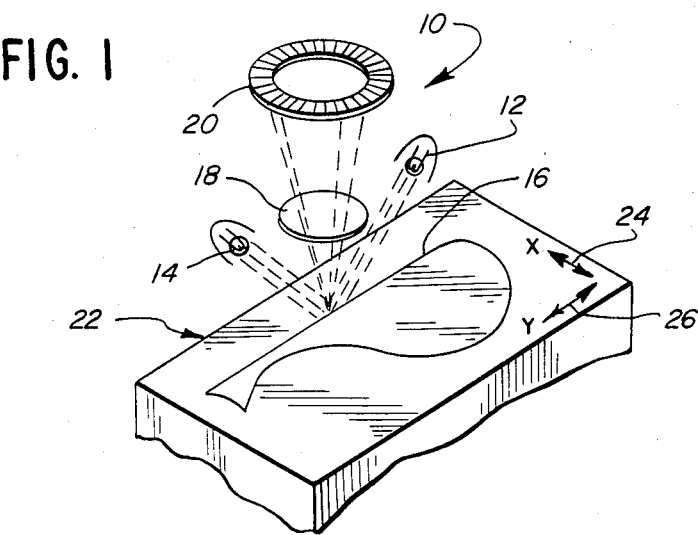
FIG. 1 is a schematic, perspective illustration of a typical pattern and a photodetector scanning head of the type used in the preferred embodiment.

Referring to FIG. 1, the pattern tracer of the present invention includes a scanning head 10 comprised of a pair of lamps 12 and 14 with parabolic reflectors for illuminating a pattern 16, a lens 18 and a photodetector 20 for photometrically detecting the pattern 16. Light from lamps 12 and 14 is reflected off the pattern 16, passed through lens 18 and impinge upon the photodetector 20. The scanning head 10 is also provided with a housing, means for making electrical connection and means for mounting it to the mechanical linkage with the electric motors. The scanning head 10 is positioned adjacent a support or table 22 to which is mounted the pattern 16.

The pattern 16 is held stationary on top of table 22, and the pattern tracer causes the scanning head 10 to move relative to table 22 when the pattern 16 is being traced. Although not shown, the pattern tracer has two electric motors for moving the scanning head 10 along the pattern. One motor is operable to move the head 10 along an X-axis 24 of a fixed Cartesian coordinate system, and the other motor is operable to move the head 10 along a Y-axis 26. Circuitry of the pattern tracer controls the velocity of both motors simultaneously to achieve the desired speed and direction of movement along the pattern.

The movement of a cutting tool, such as a torch, is controlled in accordance with the movement of the scanning head 10 to cut the pattern shape into a work piece. The pattern 16 may represent a hole in the end product or the shape of the end product, itself. The pattern can be any irregular shape with straight, curved and cornered surfaces, as illustrated.

Figure 2:
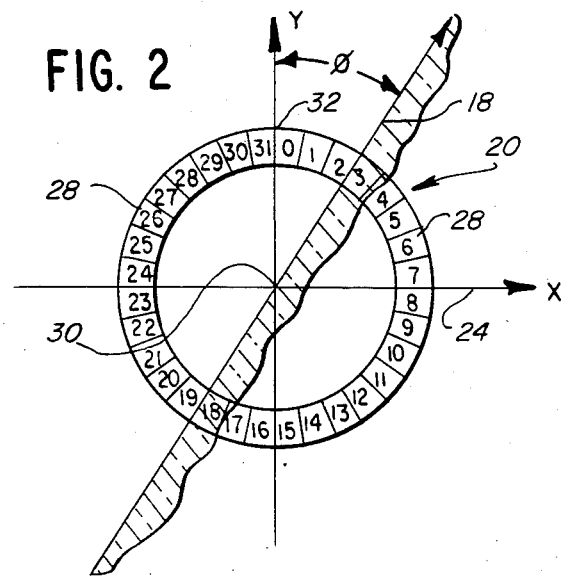
FIG. 2 is an enlarged, schematic plan view of the photodetector of FIG. 1 and a segment of a pattern for illustrating the movement of the tracing element in the absense of kerf compensation.

Referring to FIG. 2, the photodetector 20 is more clearly seen to comprise a circular array of a plurality of individual photo cells 28. In this instance, thirty-two photo cells 28 have been numbered zero through thirty-one for purposes of this description. The center 30 of the circular array defines a tracing element, the relative movement of which is used to control the cutting tool. The photo cells 28 are located closely adjacent to one another, so that there is virtually no space between the adjoining photo cells. The junction 32 of the photo cells 28 numbered thirty-one and zero is referred to herein as a reference point and the photo cell numbered zero as the reference sensor whose edge coincides with the Y-axis 26. Likewise, the junction between photo cells 28 numbered seven and eight coincides with the X-axis 24.

This mechanical orientation of the circular array of photo sensors 28 is maintained throughout the tracing maneuver in the present invention. However, due to inadvertence the orientation of the photodetector 20 may slightly vary from that illustrated, so that calibration is required to obtain accurate tracing. The photo detector 20 detects the pattern 18 to produce a pattern angle signal representative of the angle phi formed between the pattern 18 and the Y-axis 26. In the absence of any line width compensation or kerf compensation, the pattern tracer causes the photo detector 20 to move along the pattern 18 with the tracing element 30 directly overlying the pattern.

Figure 3:
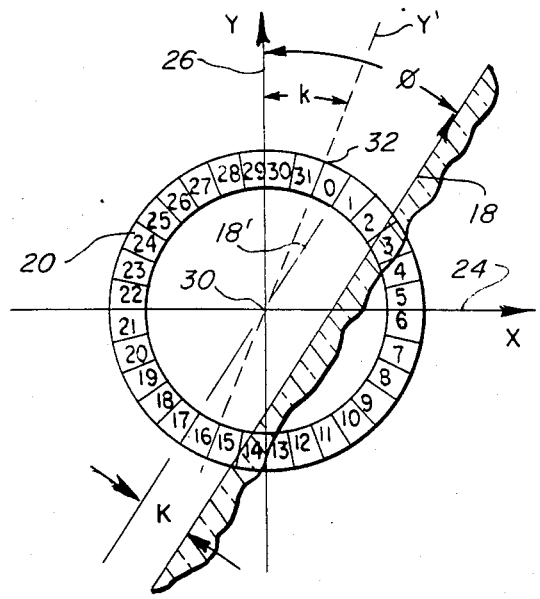
FIG. 3 is another enlarged, schematic view of a photo detector and a segment of a pattern for illustrating the establishment of lateral offset achieved by the known mechanical method of rotating the circular array of sensors.

Referring to FIG. 3, one known way of obtaining kerf compensation has been to rotate the photodetector 20 by an amount known as the kerf angle k, so that the reference point 32 is aligned with an artificial axis Y' instead of the true Y-axis 26. This results in the provision of offset signals from the photo detector 20 which causes the pattern tracer control electronics to trace the pattern with the tracing element 30 at a kerf compensated distance K laterally offset from the pattern segment 18. As will be explained, in the present invention the same effect is achieved electronically. This kerf compensation distance is selected to be half the kerf of the tool.

As seen in FIG. 3, the photo detector 20 is controlled to continue to maintain the junction between photo cells numbered two and three overlying the pattern segment 18, as shown in FIG. 2. However, the tracing element is offset by the kerf compensation distance K. In effect, an imaginary pattern 18' is followed which runs parallel to pattern 18 at a lateral kerf compensation distance K.

As described in greater detail in the aforementioned U.S. Pat. No. 4,160,199 of Bardwell, in the absence of line width compensation, the pattern tracer will function to move tracing element 30 along and directly over the leading edge of the pattern line 18. With line width compensation the tracing element 30 is caused to track the center of the line to improve tracing accuracy. One way of achieving this is to again rotate the photo detector 20 relative to the fixed X-Y coordinate system to the extent necessary for the tracer to track the center of the line.

The lateral offset, in such instance, equals the sum of half the line width plus the kerf compensation distance K. The line width compensation, of course, is always in one direction - toward the center of the line. The kerf compensation, on the other hand, can be in either direction. If inner, or positive, kerf compensation is desired instead of the negative kerf compensation shown in the known mechanical system of FIG. 3, then the photodetector 20 is rotated to a position where the reference point 32 is in the fourth quadrant on the side of Y-axis 26 opposite to that illustrated in FIG. 3. With line width compensation and positive kerf compensation combined, the net effect would be clockwise rotation by an amount equal to the arithmetic sum of a positive kerf compensation angle and a negative line width compensation angle.

Figure 4:
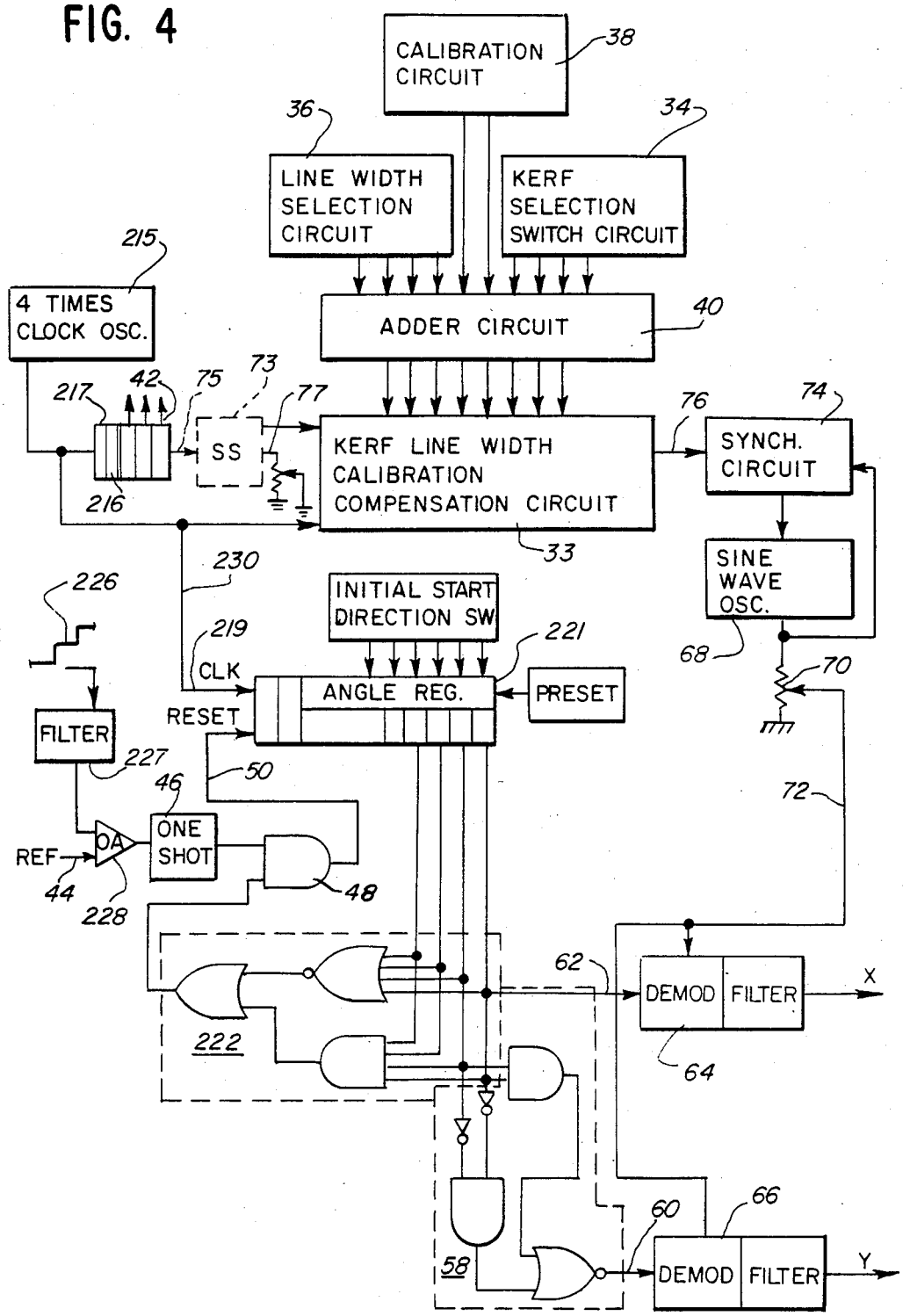
FIG. 4 is a schematic diagram, partially in functional block form, of a preferred embodiment of the pattern tracer control circuit of the present invention.

In accordance with the preferred embodiment of the present invention shown in FIG. 4, the effect of line width and kerf compensation adjustment achieved in the past by rotation of the photo detector, is obtained electronically. In addition, electronic means are provided to compensate for a fixed, nonrotatable photodetector which has inadvertently been mounted with the reference point 32 offset from the Y-axis.

Referring to FIG. 4, the pattern tracer is seen to be substantially similar to the circuit shown in FIG. 13 of U.S. Pat. No. 4,160,199, and reference should be made to this patent for a detailed description of those parts which are similar. To facilitate such reference, the reference numerals used in that patent are used on many of the same or similar parts of the circuit of FIG. 4. The parts which have been added to this circuit to achieve the advantages of this invention are a Kerf/Line Width/Calibration Compensation Circuit 33, a Kerf Selection Switch Circuit 36, a Calibration Circuit 38 and an Adder Circuit 40.

Briefly, in the absence of the new circuitry, the pattern tracer circuit of FIG. 4 functions as follows. A clock oscillator 215 generates a periodic series of clock pulses which are coupled to a scan register 216 through a divider 217 and to a clock input 230 of an angle register 221 through a divider 219. The divider 217 divides the clock frequency by four and applies the reduced frequency clock pulses to the scan register 217. Register 217 functions as a ring counter. The scan register has thirty-two inputs 42 which are respectively coupled to the thirty-two photo sensors 28 of photo detector 20. These thirty-two outputs 42 are sequentially energized one at a time to sequentially enable the photo cells 28 associated therewith to pass their pattern detection signals to a filter circuit 227. If the pattern detection signal exceeds a preselected threshold level established by a reference signal applied to the input 44 of an operational amplifier 228, the operational amplifier passes it to a one shot circuit 46. The one shot circuit 46 generates a pattern detection or control pulse 52 which is passed through an AND gate 48, if enabled, to a reset input 50 of Angle Register Circuit 221.

Figure 5:
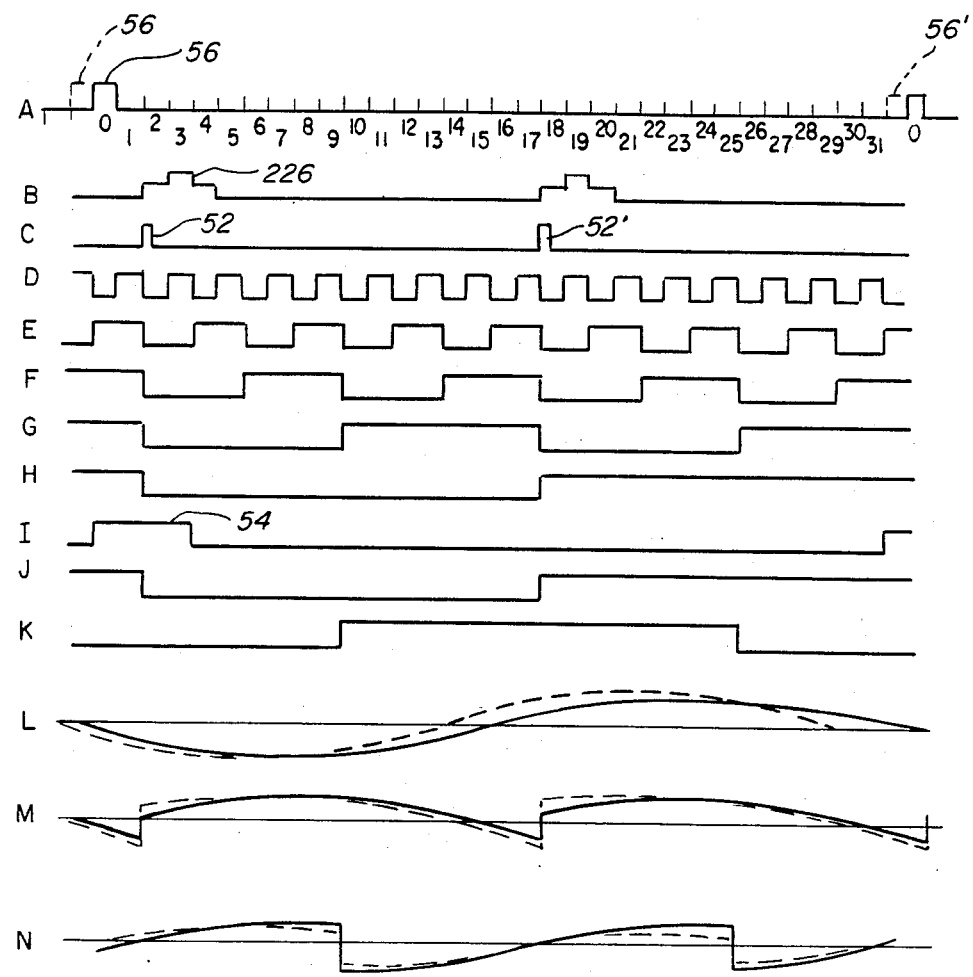
FIG. 5 is a collection of comparative waveforms of some of the signals produced by the circuit of FIG. 4.

A better understanding of the function of these circuits can be obtained by referring to FIG. 5. Waveform A represents the thirty-two time periods of one complete scan cycle established by clock oscillator 215 and scan register 216. The combined output signal waveform 226 from the photodetector is shown as waveform B in FIG. 5 for a pattern line passing through photo sensor 28 numbered three and partially underlying photo cells 28 numbered two and four. The resulting pattern detection pulse 52 is shown in waveform C of FIG. 5. The output signals of the five stages of the angle register 221 are represented by waveforms D, E, F, G and H.

A window pulse 54, shown as waveform I in FIG. 5, is developed by a window circuit 222 and applied to an enable input of AND gate 48 to permit the passage of the pattern detection pulse from one shot 46 to reset input 50 of Angle Register 221. Two pattern detection pulses are generated as shown in waveform C. The window pulse only enables the first pattern detection pulse to pass to the Angle Register 221. In the event of tracing the pattern in a direction opposite to that shown in FIGS. 2 and 3, then the window circuit 222 functions to produce a window pulse during the second pattern detection pulse 52'.

A quadrature circuit 58 also decodes the output signals of angle register 221 to produce quadrature signals on outputs 60 and 62 respectively shown as waveforms J and K of FIG. 5. These quadrature signals are respectively applied to demodulators 64 and 66. The demodulators demodulate the output sine wave signal from a sine wave oscillator 68, illustrated by waveform L of FIG. 5. A potentiometer 70 produces a sine wave on its output 72 which is proportional to the sine wave produced by sine wave oscillator 68. The magnitude of this signal determines the tracing speed and is shown in solid line as waveform L of FIG. 5.

The demodulators 64 and 66 produce output signals shown as waveforms M and N of FIG. 5. These signals, in turn, are used to produce proportional drive signals for the X and Y direction drive motors. These signals will cause the X and Y motors to move the tracing element in the direction of the pattern angle phi, and will also determine the degree of lateral offset of the tracing element 30 relative to the pattern 18.

In addition to all of the other signals, the scan register 216 generates a synch, or reference, pulse 56 each time the zero numbered photo cell 28 is enabled to sense the pattern, as shown in FIG. 5, waveform A. This reference pulse 56 is applied to a reset input 75 of the Kerf/- Line Width/Calibration Compensation Circuit 33. Circuit 33 and also to the reset input of the angle register 221 to begin angle counting in response to this synch pulse and other predetermined inputs from circuits 34, 36 and 38 produces a timing reference signal or pulse 56. In the absence of compensation, the reference pulse 56' coincides with the synch pulse 56. The timing reference pulse 56' is produced on an output 76 which is applied to a synch circuit 74. The synch circuit 74 maintains the sine wave oscillator 68 in synchronism with the compensated reference pulse 56'. The demodulation signal shown in waveforms J and K, on the other hand, are synchronized with the pattern detection pulse 52 of waveform C. Accordingly the motor control signals are representative of the temporal relationship between the pattern pulse 52 and the reference pulse 56'.

This preselected temporal relationship between the reference pulse 56' and the pattern detection pulse 52 is determined by one or more of the Line Width Selection Circuit 36, the Kerf Selection Switch Circuit 34 and the Calibration Circuit 38.

The Kerf/Line Width/Calibration Compensation Circuit 33 comprises a presettable, binary counter which is reset by the synch pulse 56 to a preselected count. When the maximum count of the counter is reached, it generates the reference pulse 56'. The timing of this reference pulse 56' and the timing of the sine wave of waveform L relative to the pattern detection pulse 52 and thus relative to the quadrature signals of waveforms J and K determines the relative magnitude and polarity of the motor control signals. Accordingly, the direction of movement of the tracing element 30 is determined.

Each of the Line Width Selection Circuit 36, the Kerf Selection Switch Circuit 34 and the Calibration Circuit 38 are provided with means for producing a binary number to which the Kerf/Line Width/Calibration Compensation Circuit 33 should be preset in order to achieve the desired offset The Line Width Selection Circuit may comprise one or more manually actuatable switches, such as described with reference to FIGS. 6 and 11 of U.S. Pat. No. 4,160,199. Preferably, however, it comprises a circuit such as shown in FIG. 12 of U.S. Pat. No. 4,160,199 which automatically calculates the necessary compensation for line width and represents that compensation in a binary number form.

The Calibration Circuit 38 and Kerf Selection Switch Circuit 34, on the other hand, both produce binary number signals manually selected in accordance with the magnitude and sense of the kerf or calibration desired by the operator of the pattern tracer. The Calibration Circuit 38 is intended to be used only once when the initial calibration is made. The Kerf Selection Switch Circuit 34, on the other hand, provides for selectively varying the kerf compensation from pattern to pattern. In lieu of mechanical storage of the kerf selection in switches, the kerf selection is achieved by means of a keyboard for entry of a kerf number into a suitable electronic storage medium, such as a binary counter.

Instead of using the calibration circuit 38, calibration is provided by means for delaying the reference pulse 56 from scan register 217 before it is applied to the Kerf/- Line Width/Calibration Compensation Circuit 33. Preferably, this comprises a monotostable multiviliator, or one shot, 73 with a variable time period established by a potentiometer 77, shown in broken line in FIG. 4. Other similar means for delaying the reference pulse 56 are also useable in place of the Kerf Selection Switch Circuit 34 and Lide Width Selection Circuit 36. The binary numbers produced by these three circuits 34, 36 and 38 are all summed by the adder circuit 40 which, in turn, applies binary signals to the Kerf/Line Width/Calibration Compensation Circuit 33 representative of the total or net compensation. In this regard, it should be appreciated that negative kerf or compensation is represented by the complement of the number representation of an equal magnitude of positive kerf. For instance, if the positive kerf is represented by a binary 18, i.e. 01001, in a five byte counter, then negative kerf of this magnitude is represented by the binary number for a count of 14, i.e. 01110. This is the difference between a full count of thirty-two for a five byte counter and the count of eighteen. Thus, the adder circuit is capable of adding both positive and negative numbers to produce a net binary number representive of all of the different types of compensation.

Preferably the kerf selection switch circuit includes a thumb wheel switch for producing an output representing the degree and sense of kerf desired. Alternately, a two position switch is employed to denote whether the kerf is positive or negative.

Since calibration is only made once, the calibration circuit does not require switches. Instead, it preferably has jumper wires or other hard wire means for permanently producing the selected degree of compensation.

When the reference pulse 56' is shifted relative to the synch pulse 56 and the pattern detection pulse 52, as shown in broken line form in FIG. 5, waveform A, then the sine wave is shifted a like amount, as shown in waveform L in broken line. As a result, the motor control signals are altered as shown by the broken line waveforms of M and N of FIG. 5.

While a detailed description of a preferred embodiment has been provided, the scope of the invention is not limited to those details, but rather is defined in the following claims.

We claim:

1. A pattern-line tracer, comprising: means for optically scanning a pattern-line in a scan cycle and developing a control signal representing pattern-line direction, means for generating a periodic reference signal having a normally fixed time relation to a predetermined time in the scan cycle, first and second motor means for positioning the scanning means in two coordinate directions in accordance with the pattern-line, drive circuits responsive to the control signal and the reference signal to derive speed control signals for first and second motor means, means for shifting the reference signal in either of two directions to provide both positive and negative kerf including a main counter reset periodically at a predetermined time in the scan cycle of the scanning means, and a positive and negative kerf counter connected to preset the count in the main counter to achieve either positive or negative kerf, said main counter having a maximum count representing a complete scan cycle, said kerf counter presetting the main counter to a first count ot achieve a certain magnitude positive kerf and to a second count equal to the maximum count minus the first count to achieve the same magnitude negative kerf, said reference signal resetting the main counter to said preset count.

2. A pattern-line tracer, comprising: means for optically scanning a pattern-line in a scan cycle and developing a control signal representing pattern-line direction, means for generating a periodic reference signal having a normally fixed time relation to a predetermined time in the scan cycle, first and second motor means for positioning the scanning means in two coordinate directions in accordance with the pattern-line, drive circuits responsive to the control signal and the reference signal to derive speed control signals for the first and second motor means, means for shifting the reference signal in either of two directions to provide both positive and negative kerf including a main counter reset periodically at a predetermined time in the scan cycle of the scanning means, and a positive and negative kerf counter connected to preset the count in the main counter to achieve either positive or negative kerf, said means for generating a periodic reference signal including a sine wave generator and the most significant digit output of the main counter is utilized to synchronize the sine wave generator to the scan cycle, said drive circuits responsive to the control signal and the reference signal for generating speed control signals for the first and second motor means including means for deriving sine and cosine speed drive signals for the first and second motor means.

3. A pattern-line tracer as defined in claim 1, wherein the main counter is reset once each scan cycle so that the maximum count in the main counter represents total scan cycle time, said kerf counter being connected to preset the main counter to a first count to achieve a specific positive kerf and being connected to preset the main counter to a second count equal to the maximum count minus the first count to achieve a negative kerf equal to the specific positive kerf.

4. A pattern-line tracer as defined in claim 1, wherein the means for developing a control signal includes an angle counter reset by the scanning means for deriving control signals at a time in the scan cycle determined by pattern-line direction.

5. A pattern-line tracer, comprising: means for optically scanning a pattern-line in a scan cycle and developing a control signal reperesenting pattern-line direction, means for generating a periodic reference signal having a normally fixed time relation to a predetermined time in the scan cycle, first and second motor means for positioning the scanning means in two coordinate directions in accordance with the pattern-line, drive circuits responsive to the control signal and the reference signal to derive speed control signals for first and second motor means, means for shifting the reference signal in either of two directions to provide both positive and negative kerf including a main counter reset periodically at a peredetermined time in the scan cycle of the scanning means, a positive and negative kerf counter connected to preset the count in the main counter to achieve either positive or negative kerf, said reference signal generator including a clock connected to drive the main counter, a reset for the main counter that resets the main counter at a specific reference point in the scan cycle, said means for generating a reference signal also including a sine wave generator, and means for synchronizing the sine wave generator to the most significant digit in the main counter, said kerf counter presetting the main counter to shift a signal representing the most significant digit in two directions to achieve positive and negative kerf.

6. A pattern-line tracer, comprising: means for optically scanning a pattern-line in a scan cycle and developing a control signal representing pattern-line direction, means for generating a periodic reference signal having a normally fixed time relation to a predetermined time in the scan cycle, first and second motor means for positioning the scanning means in two coordinate directions in accordance with the pattern-line, drive circuits responsive to the control signal and the reference signal to derive speed control signals for the first and second motor means, means for shifting the reference signal in either of two directions to provide both positive and negative kerf including a main counter reset periodically at a predetermined time in the scan cycle of the scanning means, a positive and negative kerf counter connected to preset the count in the main counter to achieve either positive or negative kerf, a line width selection counter for providing a count representing one-half the width of the line being traced, and an adder counter between the kerf counter and the main counter for algebraically summing the count in the kerf counter and the line width selection counter and applying the summed count to preset the main counter.

7. A pattern-line tracer, comprising: means for optically scanning a pattern-line in a scan cycle and developing a control signal representing pattern-line direction, means for generating a periodic reference signal having a normally fixed time relation to a predetermined time in the scan cycle, first and second motor means for positioning the scanning means in two coordinate directions in accordance with the pattern-line, drive circuits responsive to the control signal and the reference signal to derive speed control signals for the first and second motor means, means for shifting the reference signal in either of two directions to provide both positive and negative kerf including a main counter reset periodically at a predetermined time in the scan cycle of the scanning means, a positive and negative kerf counter connected to preset the count in the main counter to achieve either positive or negative kerf, and a calibration circuit counter to compensate for errors in the positioning of the scanning means with respect to the pattern-line and an adder circuit between the kerf counter and the main counter for algebraically summing the count in the kerf counter and the calibration circuit counter and applying the summed count to preset the main counter.

8. A pattern-line tracer, comprising: a tracing head movable in two coordinate directions, first motor means for moving the tracing head in one direction and second motor means for moving the tracing head in the other direction, means for optically scanning the pattern-line in a repeating scan cycle and developing a single control signal in each cycle representing pattern-line direction, means for generating a reset signal at a fixed time in each scan cycle, a clock for producing a pulse train, a sine wave generator for developing a sine wave speed control signal for the first and second motor means synchronized with respect to the reset signal, demodulating circuit means for receiving the control signal and the sine wave and deriving sine and cosine speed signals for the first and second motor means to drive the tracing head in the direction of the pattern-line, a main counter driven by the clock and reset by the reset signal for providing an output that varies the phase of the sine wave with respect to the reset signal depending upon the count therein, and a kerf counter for providing positive and negative kerf including means for presetting the count in the main counter for positive kerf and for presetting the main counter to another count for the same magnitude negative kerf.

9. A pattern-line tracer, comprising: a tracing head movable in two coordinate directions, first motor means for moving the tracing head in one direction and second motor means for moving the tracing head in the other direction, means for optically scanning the pattern-line in a repeating scan cycle and developing a single control signal in each cycle representing pattern-line direction, means for generating a reset signal at a fixed time in each scan cycle, a clock for producing a pulse train, a sine wave generator for developing a sine wave speed control signal for the first and second motor means synchronized with respect to the reset signal, demodulating circuit means for receiving the control signal and the sine wave and deriving sine and cosine speed signals for the first and second motor means to drive the tracing head in the direction of the pattern-line, a main counter driven by the clock and reset by the reset signal for providing an output that varies the phase of the sine wave with respect to the reset signal depending upon the count therein, a kerf counter for providing positive and negative kerf including means for presetting the count in the main counter for positive kerf and for presetting the main counter to another count for the same magnitude negative kerf line width selection counter for providing a count representing one-half the width of the line being traced, and an adder counter between the kerf counter and the main counter for algebraically summing the count in the kerf counter and the line width selection counter and applying the summed count to preset the main counter.

10. A pattern-line tracer, comprising: a tracing head movable in two coordinate directions, first motor means for moving the tracing head in one direction and second motor means for moving the tracing head in the other direction, means for optically scanning the pattern-line in a repeating scan cycle and developing a single control signal in each cycle representing pattern-line direction, means for generating a reset signal at a fixed time in each scan cycle, a clock for producing a pulse train, a sine wave generator for developing a sine wave speed control signal for the first and second motor means synchronized with respect to the reset signal, demodulating circuit means for receiving the control signal and the sine wave and deriving sine and cosine speed signals for the first and second motor means to drive the tracing head in the direction of the pattern-line, a main counter driven by the clock and reset by the reset signal for providing an output that varies the phase of the sine wave with respect to the reset signal depending upon the count therein, a kerf counter for providing positive and negative kerf including means for presetting the count in the main counter for positive kerf and for presetting the main counter to another count for the same magnitude negative kerf, a calibration circuit counter to compensate for errors in the positioning of the scanning means with respect to the pattern-line including a counter, and an adder circuit between the kerf counter and the main counter for algebraically summing the count in the kerf counter and the calibration circuit counter and applying the summed count to preset the main counter.

* * * * *